United States Patent [19]
Edwards

[11] Patent Number: 6,086,765
[45] Date of Patent: Jul. 11, 2000

[54] MULTI-STAGE FACULTATIVE WASTEWATER TREATMENT SYSTEM AND METHOD HYDROLYZING BIOSOLIDS

[75] Inventor: Haskell Edwards, Minden, Nev.

[73] Assignee: Atara Environmental, Inc., Reno, Nev.

[21] Appl. No.: 09/083,787

[22] Filed: May 22, 1998

Related U.S. Application Data

[63] Continuation-in-part of application No. 08/705,211, Aug. 29, 1996, abandoned.

[51] Int. Cl.$^7$ .................................................. C02F 3/30
[52] U.S. Cl. ...................... 210/605; 210/629; 210/194; 210/903
[58] Field of Search ............................ 210/195.1, 195.3, 210/202, 220, 259, 262, 605, 624, 626, 630, 903, 194, 629, 197

[56] References Cited

U.S. PATENT DOCUMENTS

| | | | |
|---|---|---|---|
| 3,773,660 | 11/1973 | Hopwood | 210/195.3 |
| 4,800,021 | 1/1989 | Desbos | 210/605 |
| 4,895,645 | 1/1990 | Zorich, Jr. | 210/195.1 |
| 5,147,547 | 9/1992 | Savall et al. | 210/605 |
| 5,234,595 | 8/1993 | Di Gregorio et al. | 210/605 |
| 5,441,634 | 8/1995 | Edwards | 210/194 |
| 5,624,512 | 4/1997 | Scroggins | 210/605 |

FOREIGN PATENT DOCUMENTS 889631  12/1981  Russian Federation .......... C02F 3/30

*Primary Examiner*—Christopher Upton
*Attorney, Agent, or Firm*—Darby & Darby

[57] ABSTRACT

A treatment system for a wastewater influent containing having a facultative tank with a vertically disposed lower anaerobic treatment zone, a middle microaerophilic treatment zone and an upper aerobic treatment zone. A baffle extends vertically in the tank in at least portions of said upper and middle zones to define a vertically extending influent section to receive the influent and an effluent section. The heavier biosolid components of the wastewater received in the influent section drop from the bottom thereof into the lower anaerobic zone for treatment and the lighter components exiting from the influent section flow into the effluent section to rise therein and be treated as they flow upwardly through said microaerophilic and aerobic zones. A lift tube for an inlet above the anaerobic zone and lifts liquid and lighter solid components into the air for aeration and flow back into the influent section. To improve efficiency, biosolids are added to the wastewater.

6 Claims, 3 Drawing Sheets

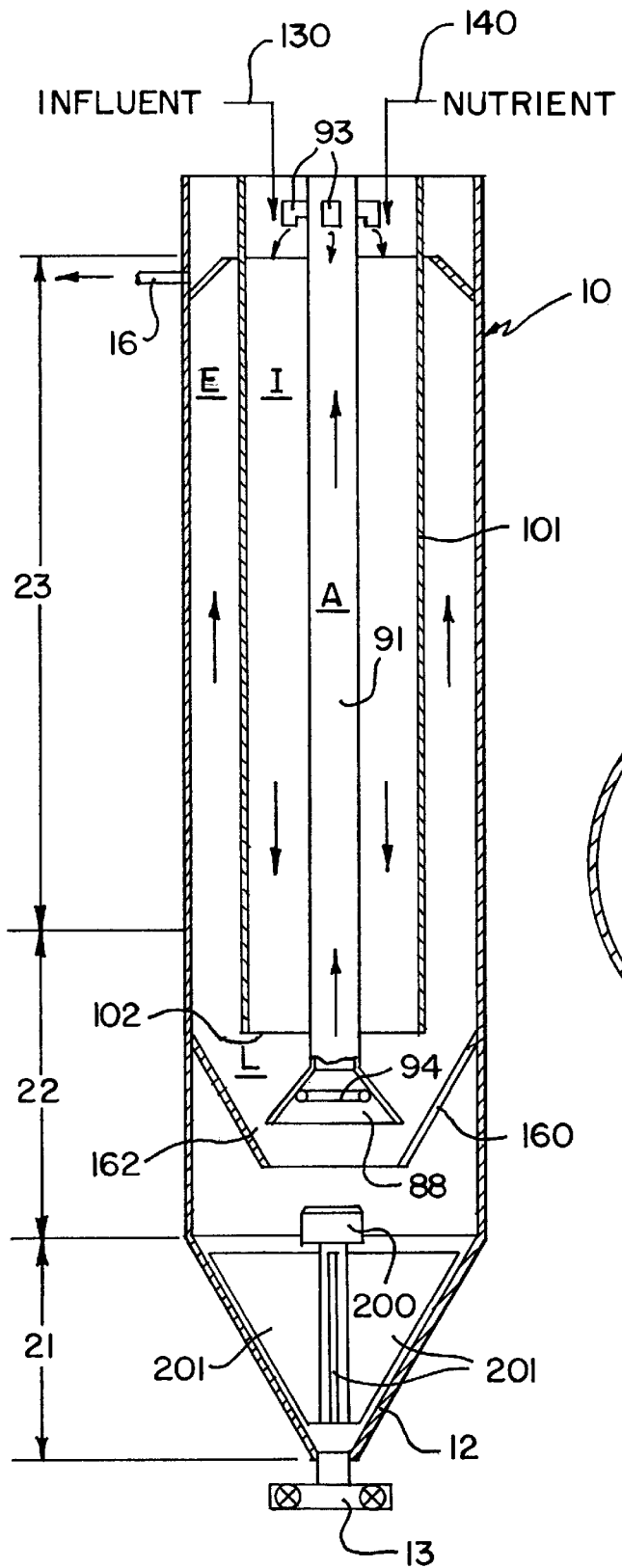

MULTI-STAGE FACULTATIVE WASTEWATER TREATMENT SYSTEM AND METHOD HYDROLYZING BIOSOLIDS

RELATED APPLICATION

This is a continuation-in-part of application Ser. No. 08/705,211, filed Aug. 29, 1996, now abandoned, which is assigned to the same Assignee, the complete disclosure of which is incorporated by reference.

BACKGROUND OF THE INVENTION

Treatment systems and methods for wastewater containing waste sludge are well known in the art. The purpose of such systems and methods is for water reclamation and pollution control by converting volatile suspended solids to bacterial cells and stabilizing and removing the resulting biosolids. In many systems and methods, wastewater is treated in an anaerobic process. Other treatment processes for solids present in waste sludge include incineration, aerobic digestion, lime stabilization, solar drying beds, etc. The result of such treatment is the volume reduction of volatile suspended solids which is disposed of in landfill or used to produce other products such as compost.

It is desired to improve the efficiency of such types of systems and methods both from the point of view of producing a final liquid effluent that can be more safely returned to the environment and also to be able to remove more of the concentrated volatile suspended solids from the waste sludge.

BRIEF DESCRIPTION OF THE INVENTION

The present invention is directed to an organic decomposition type of wastewater treatment system and method. In accordance with the invention, the wastewater influent to be treated is applied to a facultative treatment reactor having vertically stacked anaerobic, microaerophilic and aerobic treatment reaction zones. In one preferred embodiment of the invention, the influent which contains suspended solids enters the bottom portion of the facultative treatment reactor in an anaerobic zone. In this anaerobic zone the solids are subjected to extracellular enzymes produced by strict anaerobes.

The suspended solids that escape degradation by the facultative treatment process in the first, anaerobic, zone are reduced by further anaerobic reaction in this zone or removed. Lighter solids that escape degradation in the anaerobic zone of the facultative treatment reactor flow upward and enter a microaerophilic, or second, zone middle portion of the reactor where contact with extracellular enzymes produced by facultative anaerobes and other microaerophilic bacteria occurs. Dentrification occurs in the lower region of the microaerophilic zone.

Solids that escape degradation in the microaerophilic zone continue upward in the reactor and enter an upper, or third, aerobic zone where contact is made with aerobic bacteria including protozoa. In the aerobic zone most of the remaining volatile suspended solids are converted to aerobic cell growth and a smaller percentage is released as carbon dioxide. Nitrification also occurs in the aerobic zone.

The three zones are stacked vertically to make the reactor relatively compact. In another preferred embodiment, the reactor is further divided into three vertically extending concentric sections. The first, or influent, section is located between an air lift tube and a surrounding shell. The influent being treated is supplied to this section at the top of the reactor and it flows downwardly to the lowermost anaerobic zone for treatment and removal. The liquefied lighter portions of the influent not captured in the anaerobic zone flow upwardly in the second, or effluent, section between the reactor inner wall and the shell and travels through the microaerophilic and aerobic zones to be treated so as to exit as the clarified effluent at the top of the reactor tank. The third, or air lift, section is formed by the air lift tube which has an inlet at its bottom end, preferably in the transition area between the lower anaerobic zone and middle microaerophilic zone. The air lift tube raises suspended biosolids and liquid to the top of the reactor to be ejected into the air for aeration. The aerated biosolids material is returned into the influent (first) vertical section to flow to the bottom of the reactor.

Another feature of the invention includes the addition of an amount of biosolids to the wastewater being processed. This increases the overall efficiency of the treatment process.

OBJECTS OF THE INVENTION

It is therefore an object of the present invention to provide an improved wastewater and waste sludge solids treatment system and method.

An additional object is to provide a wastewater and waste sludge treatment system and method utilizing a treatment tank having three distinct vertically stacked biological zones in which the wastewater is passed into an anaerobic zone where it is treated and into which solids settle and the remaining lighter material travels upwardly passed through a microaerophilic zone, where it is further treated, and receives final treatment in an aerobic zone from which a supernatant can be discharged to the environment or can be further treated and disinfected prior to discharge.

Another object is to provide a wastewater treatment system and method using a treatment tank in which solids in the wastewater are treated in a tank by a facultative treatment process having an anaerobic zone, a microaerophilic zone and an aerobic zone in which the floc containing supernatant of the tank is materially reduced in total solids and volatility and is discharged to the environment or to drying beds or to aerobic treatment or to a classifier for solids separation where the liquid element can be returned to the head of the plant and the solids element is stored for re-use or wasting.

Yet another object is to provide an improved wastewater and waste sludge solid treatment and method having vertically stacked anaerobic, microaerophilic and aerobic treatment zones, with the microaerophilic and aerobic zones divided into vertically extending sections for receiving the biomass influent, treating the biomass and discharging the effluent, and aeration and recirculating of a portion of the influent.

A further object of the invention is to provide a treatment system in which an amount of biosolids is introduced into the system together with the wastewater for processing.

BRIEF DESCRIPTION OF THE DRAWINGS

Other objects and advantages of the present invention will become more apparent upon reference to the following Specification and annexed drawings in which:

FIGS. 3 and 3A are elevational and top views of still a further embodiment of the invention.

DETAILED DESCRIPTION OF THE INVENTION

Figure 1:
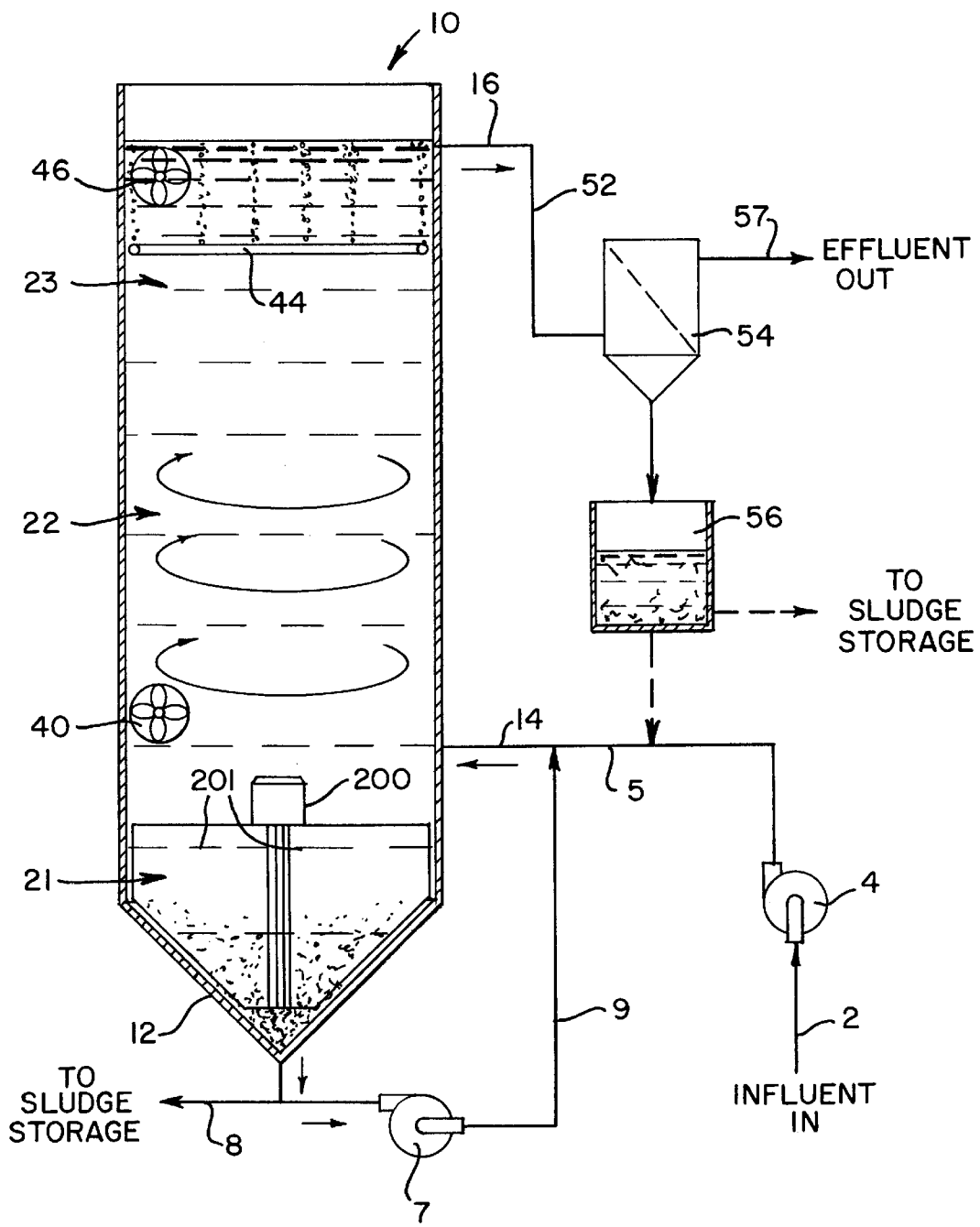
FIG. 1 is an elevational view of one embodiment of the invention.

Referring to FIG. 1, the wastewater influent containing organic solids flows in a conduit 2 and is fed into the inlet of a sludge circulation pump 4. The influent is to be discharged for processing into a facultative treatment reactor tank 10 having an open top, a generally conical shaped bottom 12, an inlet 14 and an outlet 16. Facultative treatment reactor 10 has a lower anaerobic treatment zone 21, a microaerophilic middle treatment zone 22 and an aerobic treatment zone 23.

From pump 4 the influent from conduit 2 passes through a conduit 5 and is discharged through inlet 14 into the tank. In a preferred embodiment of the invention, the inlet 14 is at the interface of the two zones 21 and 22. The interface is not a precisely defined point and shifts somewhat depending upon a number of factors, such as, for example, temperature of the contents of the tank, the amount and density of the contents, the amount of mixing of the contents of the two zones at the interface, the activity of the organisms of the two zones, turbulence of the contents, etc. In essence, it is desired to place the inlet 14 at the place of transition between the different types of contents of the two zones, but this is not totally critical. In practice, the place of transition is spread over some distance of the height of the tank and can be biased more toward the microaerophilic zone 22.

The influent from conduit 5 is mixed in tank 10 with biomass solids that settle to the bottom 12 of the tank. These settled solids leave the tank through a discharge port 13 at the tank bottom and are returned at a controlled rate and volume to the tank inlet 14 via a pump 7 through a conduit 9. These solids have not been degraded in the tank during processing. The solids settled in the bottom of tank 10 also can be removed from discharge port 13 over a conduit 8 to a sludge storage tank (not shown). Suitable control valves (not shown) are provided at the outlet 13 of the bottom of tank 1. Pump 7 preferably is of the bi-directional type so that sludge can be pumped from tank bottom 12 through conduit 8 to the storage tank or through conduit 9 to the inlet 14 of the treatment tank.

Facultative reactor tank 10 contains an adequate amount of a nutrient supplement for producing a high rate biological decomposition reaction of anaerobic, microaerophilic and aerobic micro-organisms, respectively, in the three zones 21, 22 and 23. One such supplement can be, for example, "Nature Fresh" sold by Atara BioSurge, Inc. of Minden, Nev. This supplement contains a variety of amino acids and micronutrients and also can have enzymes which are contained in a variety of herbal extracts. Other suitable nutritional supplements can be used.

The biomass supplied to tank 10 inlet 14 is subjected in an anaerobic environment in zone 21 to a variety of extracellular enzymes produced almost entirely by strict anaerobes. An anaerobic environment is present within the lower zone 21 of tank 10 because no oxygen is supplied to this zone. Some of the wastewater solids entering the facultative reactor tank 10 at the inlet 14 settle by gravity in anaerobic zone 21 to the tank conical bottom 12.

FIG. 1 shows a power driven paddle assembly 200 in the anaerobic zone 21. The assembly has a plurality of paddle blades 201 and the blades are immersed in the solids in zone 21. As the blades rotate, the material in zone 21 is stirred. This is done to effect a gentle stirring of the solid material and it improves the bacteriological reaction. Also, any gas accumulated in the material mixture is released into the facultative zone 22 from which it can travel upwardly into the aerobic zone 23 and then escape. It is preferred that the tips of the paddle blades engage the interior of the tank wall to scrape off any accumulation of material. The paddles 201 also can be used to direct the material to the bottom of the tank. This is advantageous if the tank bottom is flat.

A minor amount of the dissolved solids, normally less than about 10%, are absorbed by the enzyme reaction and are converted to cell growth of anaerobic bacteria and the balance of the dissolved solids absorbed are ultimately reduced to methane gas, carbon dioxide, nitrogen, heat and water.

A portion of the solids of the influent supplied to tank 10 are degraded in the anaerobic zone 21 and are liberated as gaseous products that flow upwardly through zones 22 and 23 and out of the open top of tank 10. The solids of the wastewater that do not settle into the conical bottom portion 12 of reactor tank 10 are entrained in liquid and rise toward the surface of the liquid at the open top of the tank. During ascent these solids are subjected to further decomposition treatment, first in the microaerophilic environment zone 22 located above the anaerobic zone 21. In the microaerophilic zone 22 a variety of different extracellular enzymes are secreted by facultative anaerobes and other microaerophilic organisms for dissolving suspended solids which the strict anaerobes did not produce or were unable to produce in sufficient quantity.

It is desirable to have a submersible mixing device, such as a low head pump 40, communicating with the inside of tank 10 located in the microaerophilic middle zone 22 at a position above inlet 14. The mixing device 40 creates mixing of influent organic solids with active anaerobic biomass above the anaerobic zone portion 21 of tank 10. The mixing device 40 establishes a localized swirling horizontal mixture of fresh influent and active biomass. The effect of the swirling horizontal turbulence effects the liquid throughout the microaerophilic reaction zone 22 that contains facultative anaerobes and other microaerophilic bacteria. Various other types of mixing arrangement can be used. For example, a blade type mixer with substantially vertical blades rotating at low speed can be used at the point where it is desired to establish the swirling horizontal mixture. One benefit of the horizontal mixing is that gas produced in the process and in lower zones 21 and 22 of the reactor is dislodged from the biosolids and separated from the bacteria to be liberated. This retards solids from floating to the surface of the liquid in zone 23.

The entrained suspended solids that are not decomposed in the anaerobic zone 21 and the microaerophilic zone 22 continue to flow upwardly in tank 10 into the aerobic zone 23 where they are acted upon by a variety of aerobic bacteria and their extracellular enzyme secretions. The aerobic zone 23 contains not only aerobic bacteria that secrete enzymes and absorb dissolved solids, but that also secrete floc forming polymers as well. The aerobic zone 23 also contains protozoa that feed on bacteria.

In the aerobic upper zone 23 of tank 10 is an aeration device 44, preferably a fine bubble diffuser that is annular and extends around the inner periphery of the tank. The preferred location of the air bubble diffuser aeration device 44 is at the mid or upper part of aerobic zone 23 such that the diffuser air bubbles should not affect more than the upper third of zone 23. It is also possible to operate the zone 23 by utilizing dissolved oxygen through photosynthesis by algae. However, this usually would only be practical for a low rate system and dissolved oxygen would be produced only during daylight hours.

A low head mixing pump 46 may be located near the surface of the liquid in zone 23 at the top of the facultative reactor tank 10. The pump 46 is desirable to circulate the mixed liquid and aids contact of aerobic bacteria and flocculation of biomass in zone 23. Creating horizontal turbulence by using pump 46 and mixing just below the liquid surface also can prevent solids from forming floating crusts on the liquid surface.

In the aerobic zone 23 the environment also permits floc forming and results in settling of suspended solids which subjects the settled aerobic floc to recycle the facultative treatment process. Much of the floc in the aerobic zone 23 settles by gravity back through the microaerophilic zone 22 and into the anaerobic zone 21 of tank 10 where it undergoes further anaerobic decomposition. Preferably, when necessary, solids, mostly inert mineralized waste, are removed as waste sludge from the bottom 12 of tank 10 and supplied to a sludge storage tank for oxidation and removal of septic anaerobic odors, such as hydrogen sulphide gas and volatile fatty acid odors.

The facultative treatment reactor 10 is a gradation of gradually decreasing (top to bottom) dissolved oxygen levels throughout the liquid from tank 10 that produces a spectrum of different reactions. At the top, there is an aerobic reaction, at the bottom an anaerobic reaction and between the two a microaerophilic reaction. As a result, treatment of the influent in zones 21, 22 and 23 produce a waste sludge containing a high concentration of mineralized solids and relatively low amounts of volatile suspended solids that settles as sludge in the conical bottom portion 12 of tank 10. At least a part of the settled sludge in bottom 12 of tank 10 can be recycled through pump 7 and pump conduit 9 to be mixed with the influent from conduit 5 and be treated again in the anaerobic zone 21.

A form of partial capture of the solids from the supernatant in the top zone 23 is preferred in order to have the availability of controlled microaerophilic sludge for use in controlled return to the facultative tank for improved bacterial concentrations.

In most cases, it is preferable to retain part of the solids in the supernatant or the solids from other treatment processes for return to the anaerobic zone of the facultative tank.

The balance of suspended solids and flocculated solids that are not settled to the bottom or into the lower levels of the tank 10 is present in a supernatant in zone 23. The supernatant liquid effluent of the facultative reactor tank exits from outlet 16 and flow through a conduit 52 to one or more of the following treatment systems.

Figure 2:
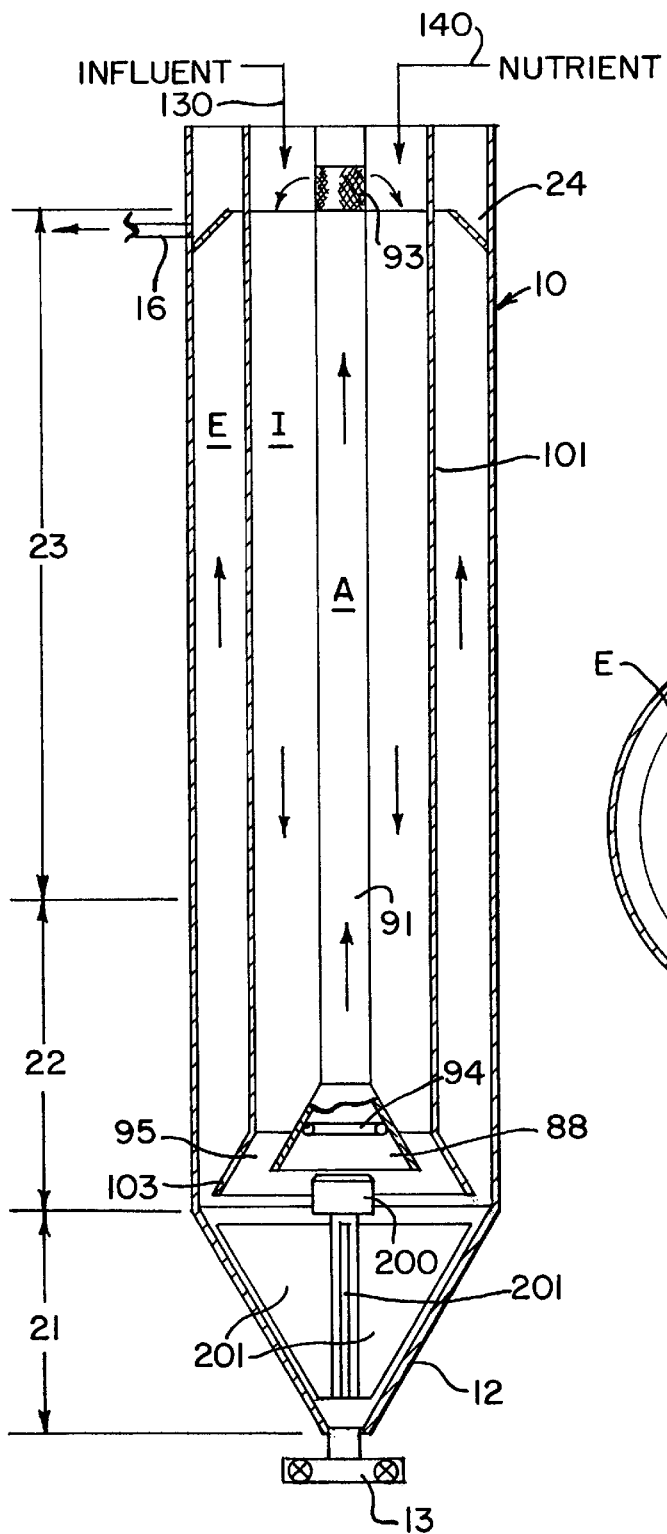
FIGS. 2 and 2A are elevational and top views of another embodiment of the invention.

First, there can be an aerated precipitator 54, for example, of the type disclosed in U.S. Pat. No. 5,441,634, granted Aug. 15, 1995, entitled "Apparatus and Method of Recalculating a Body of Fluid Containing a Mixture of Solid Waste and Water and Separating Them", and assigned to Edwards Laboratories Ltd. The effluent at the outlet of tank 10 is applied to the input of the precipitator which is a two stage device, as shown in FIG. 2 of that patent. After being treated, sludge settles in the cone of this precipitator for removal into a sludge storage tank 56 that can be returned over conduit 5 to the inlet 14 of the anaerobic zone 21 of the facultative tank. The supernatant from the precipitator 54 can be discharged over a conduit 57 to the environment to the head of the waste treatment plant or if further treatment is required, to another precipitator or settling tank or classifier. Excess sludge not required for return to the facultative tank can be wasted or sent to sludge storage if this is available.

Further treatment of the effluent from tank 10 can be accomplished in a modified sludge storage tank of the type disclosed in U.S. Pat. No. 5,441,634, Aug. 15, 1995, entitled "Apparatus and method of Recalculating a Body of Fluid Containing a Mixture of Solid Waste and Water and Separating Them", and assigned to Edwards Laboratories Ltd. The tank of FIG. 6 of that patent would be modified by removing the gas containment dome and adding a conduit and pump from the bottom of the cone to circulate fluid from the cone and discharge it into the area inside the containment cylinder. This same conduit and pump can be used with diverter valves to return sludge back to the inlet 14 in the anaerobic zone 21 of the facultative tank 10 for further treatment or to waste. The supernatant from this sludge storage tank can be discharged to the environment or to the head of the plant or to an aerobic precipitator for further treatment.

The effluent from tank 10 also can be further treated by a standard well known state of the art clarifier with or without settling tube devices. The supernatant from this clarifier can be discharged to the environment or to the head of the plant or to an aerobic precipitator for further treatment. The settled sludge can be returned to the inlet 14 of the facultative tank 10 for further treatment or direct to waste.

If fine capture of material and degassifying is required, the supernatant from the facultative tank 10 can be pumped through a membrane screening device, well known in the art, with the clear liquid being discharged to the environment or further treated aerobically or in a high rate anaerobic fixed film digester. The separated and degassified solids can be stored in a tank for return to the anaerobic zone 21 of the facultative tank or to waste as required.

A typical example of the operation of the system and method of the invention is described as follows:

The wastewater influent at inlet 14 to facultative reactor tank 10 typically contains municipal strength waste having 200 mg/l of $BOD_5$ and 240 mg/l of suspended solids. The dissolved oxygen in the anaerobic bottom zone 21 tank is zero at the top of zone 23 is maintained above 2 mg/l. The dissolved oxygen in microaerophilic zone 22 is maintained below 1 mg/l. The detention time of the liquid entering tank 10 at the concentration level stated above is approximately 1–2 hours. Tank 10 contains a concentration of from about 2 mg/l of Nature Fresh supplement in low strength municipal wastewater sludge and 80 mg/l in waste activated sludge containing 4% solids. Other suitable nutritional supplements can be used.

A second example of the operation of the invention, as described with respect to FIG. 1, is described as follows:

Waste activated sludge and/or primary sludge containing between 1–6% solids enters at inlet 14 to facultative reactor tank. The treatment is identical to the wastewater treatment process described above. The principal difference is the period of treatment, or hydraulic detention time. Depending on the concentration of volatile suspended solids, the treatment time could be as short as two days for a sludge having 1% total solids or as long as twenty days for a 6% total solids.

FIG. 2 shows a further embodiment of the invention in which the same reference numbers are used as in the previous embodiment. As in FIG. 1, within the volume of the tank 10 are formed the three vertically stacked anaerobic, facultative (also called the anoxic or microaerophilic) and aerobic zones, respectively designated 21, 22 and 23. These zones function to decompose the biomass and waste water influent as previously described. Tank 10 has the cone 12 at its lower end forming the an aerobic zone into which the heavy particles of the biomass influent settle, are treated anaerobically, and from which the resultant solid sludge is removed from outlet 13 for disposition or further treatment, as previously described.

The tank 10 also is divided internally into three vertical sections designated I (influent), A (air lift) and E (effluent) by an air lift tube 91 and a concentric baffle shell 101 around the air lift tube which is spaced from both the air lift tube and the tank inner wall. The baffle shell 101 separates the influent I and effluent E sections.

A bell, or conical, shaped inlet mouth 88 of air lift tube 91 is located at the lower end of the microaerophilic zone 22 above the top of the tank 10 lower conical end 12. Tube 91 is a conduit extending vertically in the tank with its upper end terminating in the air in a screen type discharge diffuser 93. An air diffuser 94 is located within the mouth of inlet cone 88 to supply air in the lift tube.

The influent section I is formed between the air lift tube 91 and the baffle shell 101. The influent is added from a source 130 at the top of the tank to the influent section I and flows downwardly in the tank. The vertical baffle shell 101 is a cylindrical member that has a sloped lower end 103 which is of the same general shape and is spaced from and generally parallel to the mouth 88 of the air lift tube 91 with an exit passage 95 from the influent section I between the two to the top of the anaerobic zone 21. The baffle shell sloped lower end 103 extends fairly close to the tank inner wall and restricts the communication between the influent I and effluent E vertical sections.

The effluent section E is formed between the inner wall of tank 10 and the baffle 101 in which the liquid portion of the influent travels upwardly as the effluent and undergoes biological treatment in the zones 22 and 23, as previously described. As seen, sections I and E are annular and are preferably concentric around the air lift section A.

In operation, the influent of biosolids and waste water is supplied from source 130 into the top of section I and it moves by gravity flow toward the bottom of the tank to exit at point 95 between the sloped baffle bottom 103 and the bell shaped mouth 88 of the air lift tube 91. A nutrient, such as of the "Nature Fresh" type, previously described, is also added into the tank influent section I from a source 140 to speed the decomposition reaction. The exit point 95 for the wastewater and biosolids is generally in the transition area between the anaerobic and facultative zones 21 and 22. The heavy solids of the influent settle into the anaerobic zone 21. These solids are treated and decomposed in the anaerobic zone 21, from which they are removed through an outlet 13 for further processing, as previously described. The stirrer assembly 200 also is preferably used.

The influent section I has a mixed liquor zone, that is, a mixture of liquid and lighter biosolids that have not settled into the anaerobic zone, principally in the transition area of the facultative and aerobic zones 22 and 23, in which the bulk of the biological solids are maintained as hydrolyzed solids. A portion of this liquor exiting from passage 95 is drawn into the inlet 88 of the air lift tube 91 by the action of atmospheric pressure and the air from diffuser 94. This is lifted to the top of the tube 91 above the tank contents to exit through the diffuser 93 into the atmosphere, be aerated, and recirculated back into the influent section I. This lift action further aerates the influent to speed the clarification process.

Treatment of the influent takes place in each of the sections I, A and E. That is, in section I the influent is treated by the nutrient during its travel toward the bottom of the tank. Anaerobic decomposition of the settled heavier solids takes place in zone 21. The influent is also diluted by mixing with already partially treated material which has risen in section I.

The liquor of liquid and lighter biosolids at the bottom of the influent section passes from the influent section exit passage 95 through the restricted passage between the baffle shell lower end 103 and the tank inner wall into the effluent section E. In section E, the liquid and lighter solids rise to the top of the tank into a clarification zone 24 for removal through an outlet 16. During the ascent in section E, the effluent is subjected to the treatment reaction previously described with respect to the zones 22 and 23. The shell 101 effectively isolates the influent in section I moving to the bottom of the tank from the effluent in effluent section E that travels upwardly. The relatively narrow passage between the bottom of the shell bell cone 103 and shell wall restricts larger solid particles from ascending, forcing them back to the anaerobic zone 21.

In the reactor system of FIG. 2, the greater microbial diversity of the three zones 21, 22 and 23 produces a robust microbial ecosystem with enhanced microbial interaction between the various microbial consortia, allowing for the treatment of organic waste water containing soluble and suspended solids coupled with sludge stabilization. An advantage of the configuration of FIG. 2 is that the vertical stacking of the three treatment zones 21, 22 and 23 allows for heavier flocks to settle to the bottom of the reactor where fermentation, or anaerobic, biological acidification occurs.

Untreated wastewater components and microbial solids settle through the facultative zone 22 into the anaerobic zone 21, these zones provide for solid solubilization; formation of long chain and short chain volatile fatty acids (VFA). Due to excess VFA production, the anaerobic zone 21 behaves as an acidification reactor. The pH in the anaerobic zone 21 is approximately 6.0–6.5 and there fore methane production is negligible.

The aerobic zone 23 role is similar to that of an aerobic activated sludge process in that a microbial consortia degrades and oxidizes soluble COD/BOD. The unique microbial consortia developed in the aerobic zone not only provides high rate degradation and oxidation, but also produces minimal biological solids build up which limits the sludge production.

The clarification zone 24 allows for the separation of suspended solids prior to effluent discharge. The configuration of the clarification zone is such that it permits dentrification.

There are no moving parts within the reactor and there is no requirement for recycle pumps either for sludge or mixed liquor. The limited mixing and recirculation required is provided by the air introduced into the bottom of the air lift tube by the air diffuser 93.

Microbial analysis of the strains present in the reactor indicate larger proportions of free swimming ciliates and nun-bulking microorganisms when compared to the microbial consortia in a conventional aerobic activated sludge decomposition process. The high energy expenditure of free swimming organisms, found in particularly high concentrations in the aerobic zone, lead to efficient degradation of solubilized COD/BOD without the necessity of developing a high concentration of mixed liquor suspended solids (MLSS). This contributes to lower sludge production. Another contributing factor for the low sludge production is the ability of free swimming organisms to graze on less motile bacteria which keeps the bacteria population very active. The treatment and the sludge stabilization are accomplished in the reactor of FIG. 2 at hydraulic retention times (HRTs) of about 70 percent of conventional activated sludge process. Sludge stabilization to meet USEPA Class B sludge stabilization criteria is also accomplished in the reactor at ambient temperatures.

As discussed previously, vertical stacking of the reactor's three biological zones (aerobic, microaerophilic/facultative, fermentive/anaerobic) results in the creation of environments that provide a greater diversity of microbial consortia. The combination of aerobic, anoxic and anaerobic zones in the reactor produces conditions for the production of excess volatile fatty acid production and the establishment of a microbial consortia which includes Acinetobacter species that are capable of luxurious biological phosphorus (P) uptake. *Acinetobacter johnsonii* Genospecies 7, Acinetobacter Genospecies 9, *acinetobacter radioresestens* genospecies 12 and Acinetobacter Genospecies 15 have all been identified in significant numbers in a test version of the reactor. The reactor has shown a removal, in excess of 70 percent of the influent phosphorus, without additional hydraulic retention time (HRT) requirements. The final effluent quality averaged 1.04 mg/l (range 0.22–1.60 mg/L).

In FIG. 2, the dimensions of a pilot plant are shown in inches and also in proportionate terms based on a unit dimension "x". The dimensions are adjusted in accordance with various factors, such as the amount of influent to be treated, the average solid content and density of the influent and other factors.

Table 1 shows the performance of the pilot plant over several months of operation including the influent and effluent reductions of COD and suspended solids. It should be noted that the sludge yield was less than 30% of the normal standard for activated sludge wastewater treatment.

Table 2 shows the reduction of nitrogen and phosphorous in the effluent.

TABLE 1

Biological performance - Pilot test - FIG. 1

| AVERAGE | INFLUENT RATE (GPD) | EFFLUENT RATE (GPD) | INFLUENT SS (mg/L) | INFLUENT COD (mg/l) | EFFLUENT SS (mg/L) | EFFLUENT COD (mg/L) |
|---|---|---|---|---|---|---|
| JUL | 458.79 | 457.94 | 270.61 | 331.00 | 22.69 | 43.08 |
| AUG* | 498.39 | 496.60 | 206.68 | 258.48 | 25.00 | 70.94 |
| SEP* | 471.67 | 474.25 | 312.57 | 320.67 | 31.90 | 68.40 |
| OCT* | 466.77 | 465.74 | 175.23 | 364.87 | 20.35 | 72.87 |
| NOV | 454.17 | 453.48 | 254.87 | 389.67 | 20.97 | 65.27 |
| DEC | 579.68 | 579.08 | 221.42 | 351.06 | 19.35 | 87.26 |
| JAN | 568.55 | 567.78 | 171.16 | 303.23 | 33.00 | 101.16 |
| FEB | 530.89 | 530.28 | 140.93 | 259.57 | 28.14 | 95.64 |
| MAR–APRIL | 518.87 | 518.08 | 96.42 | 241.18 | 18.53 | 74.71 |
| Daily Average | 506.18 | 505.66 | 202.23 | 311.58 | 24.25 | 75.89 |

Influent COD/BODS ratio: 2.69
Effluent COD/BODS ratio: 3.60
Average sludge production: 59.4 kg (dry solids)/1000 m³ of waste water treated
Sludge production from a conventional activated sludge plant before the anaerobic digestion
234 kg (dry solids)/1000 m³ of waste water treated (Metcalf and Eddy: Wastewater Engineering, 1991)

TABLE 2

Nitrogen and Phosphorous Removal - FIG. 1

| Average | INFLUENT RATE (GPD) | EFFLUENT RATE (GPD) | INF TKN | INF Nitrate | INF Tot P | EFF TKN | EFF Nitrate | EFF Tot P |
|---|---|---|---|---|---|---|---|---|
| JUL | 458.79 | 457.94 | 20.00 | 0.05 | 4.78 | 14.00 | 0.12 | 1.30 |
| AUG | 498.39 | 496.60 | 18.20 | 2.73 | 1.95 | 14.91 | 0.13 | 3.53 |
| SEP | 471.67 | 474.25 | 21.23 | 0.18 | 6.43 | 12.83 | 0.18 | 1.32 |
| OCT | 466.77 | 465.74 | 19.77 | 0.18 | 3.44 | 13.00 | 0.25 | 1.04 |
| NOV | 454.17 | 453.48 | 22.23 | 0.17 | 3.68 | 10.62 | 0.89 | 0.86 |
| DEC | 579.68 | 579.08 | 19.61 | 0.09 | 3.39 | 10.54 | 2.16 | 0.90 |
| JAN | 568.55 | 567.78 | 20.71 | 0.12 | 3.64 | 15.03 | 0.45 | 1.26 |
| FEB | 530.89 | 530.28 | 18.46 | 0.10 | 5.56 | 13.72 | 0.16 | 1.26 |
| MAR–APR | 518.87 | 518.08 | 14.12 | 0.11 | 2.38 | 9.83 | 0.41 | 1.05 |
| Daily Average | 506.18 | 505.66 | 19.21 | 0.30 | 3.88 | 12.39 | 0.59 | 1.30 |

Figure 2A:
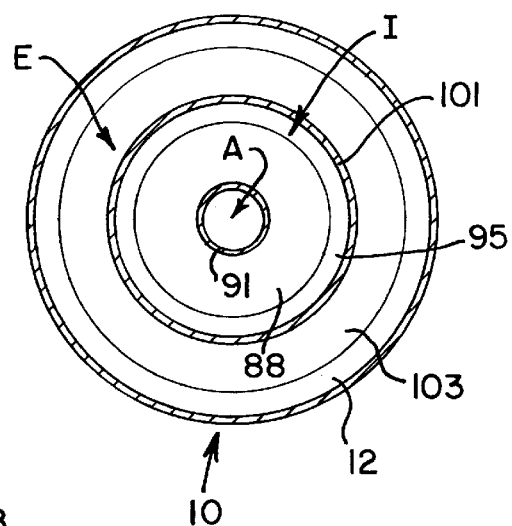

The system of FIGS. 2 and 2A also has been shown to operate with less objectionable odor as compared to a conventional anaerobic digester. Odor tests have been conducted on sludge produced by a system of the type as shown in FIG. 2 and sludge from conventional anaerobic digester. On a scale of 0 (no odor) to 5 (very bad odor) the sludge of the reactor of the invention had an odor value of 1.3 (std. dev. 0.87), while the sludge from the conventional anaerobic digester had an odor value of 2.3 (std. dev. 0.76). Based on Friedman non-parametic analysis of the data, this translates into a non-offensive odor sludge from the reactor of FIG. 2 while the sludge from conventional anaerobic digester was rated as offensive with a confidence level of 99.9 percent.

The flow pattern of the liquid within the rector creates environment suitable for nitrogen and phosphorous removal. The circulation of the biomass through the aerobic and anoxic (or facultative) phase provides nitrification and denitrification to remove nitrogen. The bacteria present (pseudomonads, clostridia spp., aromonass spp., anetobactor spp.) in the aerobic zone deaminates nitrogen from proteins and converts into ammonia, which gets converted to nitrite by nitrosomonas bacteria and nitrite is converted into nitrate by nitrobacter bacteria. The facultative anaerobes present in the anoxic (facultative) zone denitrifies the nitrates into nitrogen gas which escapes to the atmosphere. The denitrification process requires an easily degradable carbon source which is provided by the short chain fatty acids generated in the anaerobic zone (15).

Phosphorus is removed when poly-P bacteria circulates between anaerobic zone, free from nitrates, rich in short chain fatty acid and food depleted aerobic zone. The nitrate free anaerobic zone provides an oxygen free atmosphere where poly-P bacteria absorb short chain fatty acid and releases phosphorus. When the poly-P bacteria reaches food depleted aerobic zone it starts to utilize its stored short chain fatty acid. The energy produced during this process is utilized to reabsorb phosphorous because phosphorus transports energy within the cell metabolism. A large storage of short chain fatty acid will allow the poly-P bacteria to reabsorb more phosphorous. The reabsorbed phosphorous is removed from the system when the excessive sludge is wasted.

In FIG. 2, aerobic zone (23) microbes nitrifies nitrogen (protein—$NH_3$—$NO_2$—$NO_3$) into nitrates and the facultative anaerobes present in anoxic zone (22) denitrify nitrates into nitrogen gas as the mixture of proteins, ammonia, nitrites and nitrates circulates in the mix liquor and airlift (91). The top layer of anaerobic zone (21) contains short chain fatty acids due to the hydrolysis of settled solids. This layer is void of oxygen and nitrates as nitrates circulates in the mixed liquor and aeration zone. In this layer poly-P bacteria absorbs the short chain fatty acid and releases phosphorous into the circulating liquor. Poly-P bacteria is eventually picked up in the circulation and when it reaches food depleted aerobic zone it absorbs the soluble phosphorous in excess. This phenomenon creates a phosphorous rich anaerobic zone. The phosphorus rich sludge is wasted from the bottom of the anaerobic zone.

Phosphorus and nitrogen removal is more efficient when high strength waste water is treated. In the treatment of high strength wastewater the anaerobic zone provides abundance of short chain fatty acid required for the removal of nitrogen and phosphorus.

The system of the invention has been found to have advantages in treating biosolids simultaneously with the wastewater. A typical wastewater treatment plant makes use of bacteria to absorb soluble BOD from the raw influent water, converting its carbon and nitrogen in cell growth. Protozoa feed on the bacteria, helping to control its population. The result is organic compounds in wastewater which are converted to cell growth or biosolids. One pound of BOD entering a wastewater treatment facility will typically generate approximately 0.75 pounds of biosolids.

In order to maintain efficient operations and to produce an effluent that is free of pollutants, the plant operator must monitor the concentration of suspended solids (mixed liquor) in the treatment basins daily and dispose of waste biosolids accordingly to maintain the desired level of mixed liquor.

Biosolids contain a membrane that protects the cell contents. This membrane is resistant to breakdown. However, certain bacteria under certain conditions have the ability to produce enzymes to dissolve the membrane. Once the membrane is penetrated or dissolved bacteria can absorb the cell contents. The most efficient method of biologically treating biosolids is anaerobic digestion.

As described above, the tank of the invention has three separate environmental treatment zones. The zones are stacked vertically, aerobic zone 23 at the top of the tank, the middle micro-aerophilic zone 22, occupying approximately 70% of the reactor volume in a typical system, and anaerobic zone 21 at the bottom of the vessel. When biosolids are added to the wastewater influent stream they quickly settle into the bottom anaerobic zone where they are subjected to fermentation and hydrolyses. The cell contents reduce to volatile fatty acids (VFA) reducing the pH. Because the airlift 91 is located above the anaerobic zone 21, VFAs are drawn up into the circulation stream and are oxidized in the aerobic zone 23. In a preferred embodiment, biosolids are used to constitute about 20% of the total influent flow into the system.

An advantage of having VFAs rising from the bottom anaerobic zone 21 is that it is used as an energy source for facultative organisms in the lower part of the micro-aerophilic environment 22 where there is little or no dissolved oxygen available. When there is carbon available, but now dissolved oxygen present, facultative anaerobes will use oxygen combined in nitrate nitrogen. This action releases nitrogen to the atmosphere.

Once nitrate is removed, selective bacteria remove phosphorus, via biological luxury phosphorus uptake.

The advantage to accomplishing biochemical oxygen demand (BOD-5), suspended solids (S/S), biological nutrient removal (BNR) are many. These include lower capital cost, lower operating expense, less equipment, tanks, controls, valves, piping and less manpower.

FIGS. 3 and 3A show a further embodiment of the invention. The same reference numerals are used for components which are shown in FIGS. 1 and 2.

In FIG. 3, the outlet 94 of the air lift tube 91 is configured to have a plurality of controlled spigots 93 which discharge the lifted material into the influent section I. The lower end 102 of the baffle terminates above the cone shaped inlet 88 of the air lift tube. A downwardly sloping deflector 160 extends around the tank inner wall in a generally transverse direction to the air lift inlet 88 to define an outlet passage 162 into the microaerophilic zone 22.

In the system of FIG. 3, the influent from source 130 travels downwardly in section I. The heavier particles of the biomass drop by gravity through the opening 162 and settle in the anaerobic zone 21 for treatment, as previously described. This embodiment also preferably has the stirrer assembly 200 in the anaerobic zone 21. A portion of the lighter particles of the biomass and liquid also exit through the passage 162 and enters into the air lift tube inlet 88 to be conveyed upwardly for aeration upon discharge from the spigots 94.

The liquor exists in the zone L which is below the bottom end 102 of baffle 101, the deflector 160 and the lower end of the air lift inlet cone 88. The heavier portion exits by gravity from passage 162 to be lifted in the air lift tube 93 for further aeration. The lighter portion of the liquor rises in the effluent section E through the zones 22 and 23 for treatment, as previously described.

In FIG. 3, the dimensions of the tank 10 are shown in terms of the relative dimension "x", but these can be varied to meet the particular application.

The systems of FIGS. 2 and 3 also can use the post treatment elements for the supernatant and sludge as described with respect to FIG. 1.

Specific features of the invention are shown in one or more of the drawings for convenience only, as each feature may be combined with other features in accordance with the invention. Alternative embodiments will be recognized by those skilled in the art and are intended to be included within the scope of the claims.

We claim:

1. A method for treating a wastewater influent comprising:
   providing an uppermost aerobic zone, an anoxic zone; and, a lowermost anaerobic zone arranged in a vertically disposed relationship in a substantially closed cylindrical vessel having a bottom approximating an inverted cone; wherein said anaerobic zone is adjacent to said anoxic zone, and said anoxic zone is adjacent to said aerobic zone;
   feeding said influent at about the interface of said anaerobic zone and anoxic zone sufficient to contribute to causing an upflow through said anoxic zone and said aerobic zone;
   feeding air at about the lowest most portion of said aerobic zone;
   inducing a substantially horizontal rotational motion component to said upflow;
   enabling solids from said upflow to settle into said anaerobic zone;
   withdrawing an overflow stream from about an uppermost point of said aerobic zone;
   providing a screening zone;
   feeding said overflow stream into said screening zone;
   withdrawing an effluent from said screening zone;
   withdrawing a first substantially solids fraction from said screening zone;
   passing at least a portion of said first substantially solids fraction to a sludge storage zone and/or passing at least a portion of said first substantially solids fraction to at about the interface of said anaerobic zone and anoxic zone;
   withdrawing a second substantially solids fraction from about a lowest most portion of said anaerobic zone; and,
   passing at least a portion of said second substantially solids fraction to a sludge storage zone and/or passing at least a portion of said second substantially solids fraction to at about the interface of said anaerobic zone and anoxic zone.

2. A method as in claim 1 wherein said influent has an ss concentration of up to and including 312.57 mg/L and a COD concentration of up to an including about 389.67 mg/L and the effluent withdrawn has an ss concentration as low as about 18.53 mg/L; a COD concentration as low as about 43.08 mg/L; a TKN concentration as low as about 9.83 (mg/L); a nitrate concentration as low as about 0.12 (mg/L) and a total phosphorous concentration as low as about 0.86 (mg/L).

3. A method for treating a wastewater influent, comprising:
   providing an uppermost aerobic zone, an anoxic zone; and, a lowermost anaerobic zone arranged in a vertically disposed relationship in a substantially closed cylindrical vessel having a bottom approximating an inverted cone; wherein said anaerobic zone is adjacent to said anoxic zone, and said anoxic zone is adjacent to said aerobic zone;
   feeding said influent to about the interface of said anaerobic zone and anoxic zone sufficient to contribute to causing an upflow through said anoxic zone and said aeration zone;
   inducing a substantially horizontal rotational motion component to said upflow;
   enabling solids from said upflow to settle into said anaerobic zone;
   withdrawing an overflow stream from about an uppermost point of said aerobic zone;
   providing a screening zone;
   feeding said overflow stream into said screening zone;
   withdrawing an effluent from said screening zone;
   withdrawing a first substantially solids fraction from said screening zone;
   passing at least a portion of said first substantially solids fraction to a sludge storage zone and/or passing at least a portion of said first substantially solids fraction to at about the interface of said anaerobic zone and anoxic zone;
   withdrawing a second substantially solids fraction from about a lower most of said anaerobic zone; and,
   passing at least a portion of said second substantially solids fraction to a sludge storage zone and/or passing at least a portion of said second substantially solids fraction to at about the interface of said anaerobic zone and anoxic zone.

4. A method as in claim 3 wherein said influent has an ss concentration of up to and including 312.57 mg/L and a COD concentration of up to an including about 389.67 mg/L and the effluent withdrawn has an ss concentration as low as about 18.53 mg/L; a COD concentration as low as about 43.08 mg/L; a TKN concentration as low as about 9.83 (mg/L); a nitrate concentration as low as about 0.12 (mg/L) and a total phosphorous concentration as low as about 0.86 (mg/L).

5. An apparatus for treating wastewater, comprising:
   a substantially closed vessel having an upper portion substantially approximating a cylinder and a bottom substantially approximating an inverted cone;
   a first inlet for feeding wastewater influent into said vessel;
   a first outlet for withdrawing a clarified liquid effluent from said vessel;
   an aerobic zone means located in said upper portion;
   a first device positioned within said vessel for inducing a substantially horizontal rotational motion component to upflow within said aerobic zone means;

a second inlet for feeding air into at about the bottom of said aerobic zone means;

an anoxic zone means located contiguous to and below said aerobic zone means within said upper portion;

a second device positioned within said vessel for inducing a substantially horizontal rotational motion component to upflow within said anoxic zone means;

an anaerobic zone means located within said bottom; and, a second outlet located at said bottom for withdrawing substantially solids.

6. A method comprising:

providing an apparatus that includes: a substantially closed vessel having an upper portion substantially approximating a cylinder and a bottom substantially approximating an inverted cone; a first inlet for feeding wastewater influent into said vessel; a first outlet for withdrawing a clarified liquid effluent from said vessel; an aerobic zone means located in said upper portion; a first device positioned within said vessel for inducing a substantially horizontal rotational motion component to upflow within said aerobic zone means; a second inlet for feeding air into at about the bottom of said aerobic zone means; an anoxic zone means located contiguous to and below said aerobic zone means within said upper portion; a second device positioned within said vessel for inducing a substantially horizontal rotational motion component to upflow within said anoxic zone means; an anaerobic zone means located within said bottom; and, a second outlet located at said bottom for withdrawing substantially solids;

feeding a wastewater influent into said vessel;

withdrawing a clarified effluent from about the top of said vessel; and, withdrawing substantially solids from about the bottom of said vessel.

* * * * *